(12) United States Patent
Mazuir et al.

(10) Patent No.: US 10,477,659 B1
(45) Date of Patent: Nov. 12, 2019

(54) ADJUSTABLE LIGHTING SYSTEMS

(71) Applicants: Clarisse Mazuir, San Jose, CA (US); Devin W. Chalmers, Sunnyvale, CA (US); David E. Kingman, Campbell, CA (US); Budhadipta Dan, San Jose, CA (US); Gregory A. Cohoon, Sunnyvale, CA (US)

(72) Inventors: Clarisse Mazuir, San Jose, CA (US); Devin W. Chalmers, Sunnyvale, CA (US); David E. Kingman, Campbell, CA (US); Budhadipta Dan, San Jose, CA (US); Gregory A. Cohoon, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/682,929

(22) Filed: Aug. 22, 2017

Related U.S. Application Data

(60) Provisional application No. 62/394,893, filed on Sep. 15, 2016.

(51) Int. Cl.
*H05B 41/39* (2006.01)
*G02F 1/1335* (2006.01)
*G09G 3/22* (2006.01)
*G09G 5/10* (2006.01)
*H05B 39/04* (2006.01)

(52) U.S. Cl.
CPC ....... *H05B 41/39* (2013.01); *G02F 1/133615* (2013.01); *G09G 3/22* (2013.01); *G09G 5/10* (2013.01); *H05B 39/042* (2013.01); *G09G 2320/0626* (2013.01)

(58) Field of Classification Search
CPC . H05B 41/39; H05B 39/042; H02F 1/133615; G09G 2320/0626
See application file for complete search history.

(56) References Cited

U.S. PATENT DOCUMENTS

| | | | |
|---|---|---|---|
| 7,619,370 B2 | 11/2009 | Chemel et al. | |
| 7,961,113 B2 | 6/2011 | Rabiner et al. | |
| 8,848,029 B2 | 9/2014 | Moletti et al. | |
| 9,326,359 B2 | 4/2016 | Bosua | |
| 2004/0001056 A1* | 1/2004 | Atherton | G02F 1/163 345/212 |
| 2006/0017805 A1 | 1/2006 | Rodman | |
| 2007/0029946 A1 | 2/2007 | Yu et al. | |
| 2008/0143818 A1 | 6/2008 | Ferren et al. | |
| 2008/0298054 A1* | 12/2008 | Paulussen | F21V 13/02 362/231 |
| 2010/0244708 A1* | 9/2010 | Cheung | H05B 37/0218 315/158 |
| 2013/0271004 A1* | 10/2013 | Min | H05B 33/0842 315/112 |
| 2014/0001959 A1* | 1/2014 | Motley | H05B 37/02 315/149 |
| 2014/0292206 A1 | 10/2014 | Lashina et al. | |
| 2014/0343699 A1 | 11/2014 | Engelen et al. | |
| 2015/0084513 A1 | 3/2015 | Anthony et al. | |
| 2016/0128157 A1 | 5/2016 | Ulivella et al. | |
| 2016/0366746 A1* | 12/2016 | van de Ven | F21V 29/74 |
| 2017/0064169 A1* | 3/2017 | Mishra | H04N 5/2354 |

* cited by examiner

*Primary Examiner* — Ariel A Balaoing
(74) *Attorney, Agent, or Firm* — Young Basile Hanlon & MacFarlane, P.C.

(57) ABSTRACT

An adjustable lighting system is controlled to achieve a configuration for an internal light condition.

16 Claims, 12 Drawing Sheets

ADJUSTABLE LIGHTING SYSTEMS

CROSS-REFERENCE TO RELATED APPLICATIONS

This application claims the benefit of U.S. Provisional Application No. 62/394,893, filed on Sep. 15, 2016, entitled "Adjustable Lighting Systems," the content of which is hereby incorporated by reference in its entirety for all purposes.

TECHNICAL FIELD

The application relates generally to adjustable lighting.

BACKGROUND

Lighting conditions in enclosed spaces may be dependent upon a variety of factors. As an example, lighting in a room may be dependent on internal light from an electric lamp in combination with external light from the sun. In this example, the external lighting condition may change, such as when a cloud passes in front of the sun, or as the sun rises or sets. Such a change in the external lighting condition may result in a change in the internal lighting condition.

SUMMARY

One aspect of the disclosed embodiments is an apparatus that includes an enclosure that has one or more windows, one or more internal sensors that sense an internal light condition and generate an internal light condition signal that corresponds to the internal light condition, one or more lighting control components, and a controller. The controller is configured to receive data that represents an image, determine a configuration for the internal light condition based on the image, and control operation of the one or more lighting control components to maintain the internal light condition according to the configuration.

Another aspect of the disclosed embodiments is an enclosure having a window that permits passage of external light from an external light source into the enclosure, wherein the window comprises an edge lit panel for providing additional light, wherein when external light passes through the window the external light passes through the edge lit panel, one or more internal sensors configured to generate an internal light condition signal that corresponds to an illumination intensity inside the enclosure, a controller configured to receive the internal light condition signal and control operation of at least the edge lit panel to provide additional light to an interior of the enclosure.

Systems and methods are also described herein.

DETAILED DESCRIPTION

Figure 1:
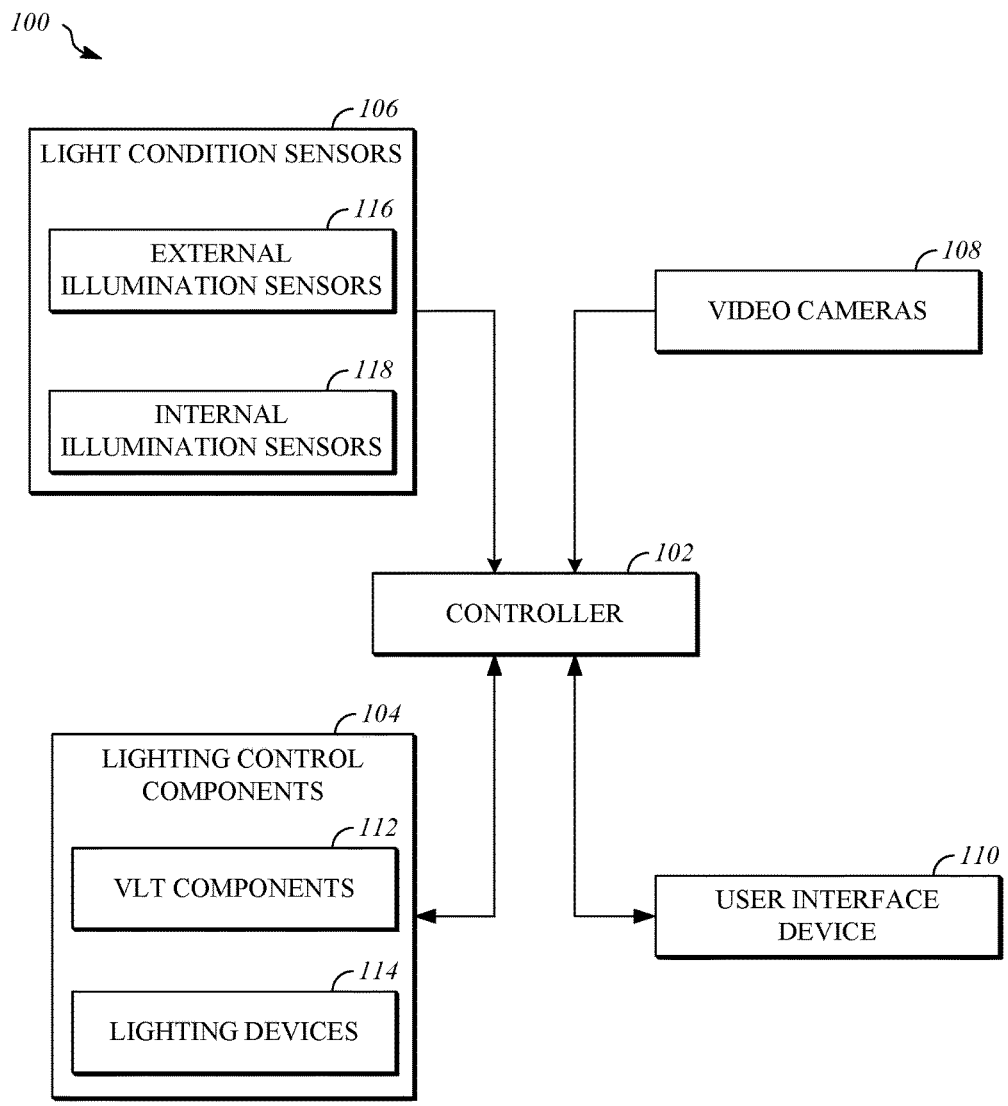
FIG. 1 is a block diagram showing a first example of an adjustable lighting system.

FIG. 1 is a block diagram that shows an adjustable lighting system 100. The adjustable lighting system 100 may include a controller 102, lighting control components 104, light condition sensors 106, cameras 108, and a user interface device 110.

The adjustable lighting system 100 is operable to regulate the lighting conditions in an area, such as an enclosed space such as a room or a compartment in a transportation system. The lighting condition inside the enclosed space may be referred to herein as an internal light condition. The enclosed space may receive illumination that originates outside of the enclosed space, and the outside light that the enclosed space is subjected to may be referred to herein as an external lighting condition.

The controller 102 coordinates operation of the various components of the adjustable lighting system 100. The controller 102 may receive information (e.g., signals and/or data) from various components of the adjustable lighting system 100, such as the light condition sensors 106, the cameras 108, and the user interface device 110. In some embodiments, this information is used by the controller 102 to change operating parameters or characteristics of one or more components of the adjustable lighting system, such as the lighting control components 104. As an example, the controller 102 may send commands to the lighting control components 104 to change operating parameters or characteristics for the lighting control components 104. The controller 102 may operate the various components of the adjustable lighting system 100 to achieve and maintain a configuration for the internal light condition. The configuration for the internal light condition may be a predetermined state, such as a state corresponding to default settings or previously-made user-selected settings for the adjustable lighting system 100.

The controller 102 may communicate electronically with the components of the adjustable lighting system 100. As one example, the controller 102 may be connected to the lighting control components 104, the light condition sensors 106, the cameras 108, and/or the user interface device 110 by wired connections that are able to transmit information in any suitable form. As one example, the controller 102 and any or all of the lighting control components 104, the light condition sensors 106, the cameras 108, and/or the user interface device 110 may incorporate a wireless communication interface that allows wireless transmission of information in any suitable form. Examples of wireless communication protocols that may be used include the 802.11 standard maintained by the Institute of Electrical and Electronics Engineers, and the Bluetooth standard maintained by the Bluetooth Special Interest Group.

The lighting control components 104 include components that are operable to change the lighting condition within the space that is illuminated by the adjustable lighting system 100. The lighting control components 104 may include any structure or feature that is operable to modify the amount of light that is incident upon surfaces within the space that is being illuminated by the adjustable lighting system. The controller 102 may modify operation of the one or more lighting control components 104 by changing a property or operating characteristic of the one or more lighting control components.

In some embodiments, some of the lighting control components 104 may utilize variable light transmittance (VLT) technologies to regulate the amount of external light that enters the space being illuminated by the adjustable lighting system 100. As an example, the lighting control components may include variable light transmittance components, which are referred to herein as VLT components 112. The VLT components 112 are able to change the amount of light that is transmitted through a structure that otherwise allows transmittance of light. The VLT components 112 may be operated by a control signal, such as a control signal from the controller 102. The control signal may cause the VLT components 112 to modify a current light transmittance characteristic such that, in response to the control signal, the VLT components 112 are modified from having a first light transmittance value to having a second light transmittance value. As an example, the VLT components 112 may be applied to or incorporated in transparent or translucent structures such as windows. Technologies that may be used to implement the VLT components 112 include suspended particle devices, electrochromic devices, polymer dispersed liquid crystal devices, and guest host liquid crystal devices. In some embodiments, the VLT components 112 may be applied to windows or other structures that allow light from an external light source to enter the space, in order to regulate the amount of light from the external light source that enters the space being illuminated by the adjustable lighting system 100.

In some embodiments, the lighting control components 104 include lighting devices 114. The lighting devices 114 may be or include lamps of any type. As used herein, the term "lamp" refers to any type of electrically-operated device that emits light, such as incandescent lighting devices, fluorescent lighting devices, halogen, lighting devices, and light-emitting diodes. In some embodiments, the lighting devices 114 include one or more arrays of lighting devices, which may be one or more arrays of electric lamps. In some embodiments that include multiple lighting devices, the lighting devices 114 may be operated by a single control signal from the controller that specifies operating characteristics for the lighting devices 114. In some embodiments that include multiple lighting devices, the lighting devices 114 may be operated by multiple control signals that are each directed to a group of one or more of the lighting devices 114.

The lighting devices 114, such as the one or more electric lamps, may have at least one variable illumination characteristic. In embodiments where the lighting devices 114 have at least one variable illumination characteristic, the controller 102 may modify operation of the lighting devices 114 by sending a control signal to the lighting devices 114 that changes the at least one variable illumination characteristic. As one example, the variable illumination characteristic of the lighting devices 114 may be an illumination intensity of the light emitted by the lighting devices 114, in which case, the lighting devices 114 may be referred to as dimmable lighting devices or dimmable lamps. As another example, the variable illumination characteristic of the lighting devices 114 may be a color temperature of the light emitted by the lighting devices 114. As another example, the variable illumination characteristic of the lighting devices 114 may be a color or hue of the light emitted by the lighting devices 114.

The light condition sensors 106 include components that are operable to sense light conditions in and/or around the area that is illuminated by the adjustable lighting system 100. The light condition sensors 106 may be or include photodetectors of any type, such as photodetectors that operate using photoemission, photoelectric, or photovoltaic light detection mechanisms. In some embodiments, some or all of the light condition sensors 106 output a signal that indicates the intensity of light that is incident upon the sensor, expressed in units such as lumens per square meter. In some embodiments, some or all of the light condition sensors 106 output one or more signals that indicate the color temperature of the light that is incident upon the sensor, expressed in units such as Kelvins. In some embodiments, some or all of the light condition sensors 106 output one or more signals that indicate the hue of the light that is incident upon the sensor, which may be expressed in, for example, units indicating the relative intensity of red, blue, and green sensing elements of the sensor.

In some embodiments, the light condition sensors 106 include two or more groups of sensors that are utilized differently by the controller 102. As will be explained herein, the controller may utilize the two or more groups of sensors from the light condition sensors 106 to determine how to modify operating characteristics of the lighting control components 104.

As an example, the light condition sensors 106 may include one or more external illumination sensors 116 and one or more internal sensors 118. The external illumination sensors 116 are located outside of the space that is illuminated by the adjustable lighting system 100. The external illumination sensors 116 are operable to sense an external light condition and generate an external light condition signal that corresponds to the external light condition. The internal sensors 118 are located inside of the space that is illuminated by the adjustable lighting system 100. The internal sensors 118 are operable to sense an internal light condition and generate an internal light condition signal that corresponds to the internal light condition.

The cameras 108 may be any type of image capture device that is able to generate data that represents an image or data that represents a series of images. As examples, the cameras 108 may be visible spectrum still cameras or visible spectrum video cameras. The image signals generated by the cameras 108 depict objects and people that are present in a field-of-view of the cameras 108. In some embodiments, the cameras 108 are oriented toward an interior of the space that is being illuminated by the adjustable lighting system 100. In some embodiments, the cameras 108 are oriented toward an environment that is located outside of the space that is being illuminated by the adjustable lighting system 100. In some embodiments, the cameras 108 include one or more cameras that are oriented toward the interior of the space that is being illuminated by the adjustable lighting system 100 in combination with one or more cameras that are oriented toward the environment that is located outside of the space that is being illuminated by the adjustable lighting system 100.

The user interface device 110 may be included in the adjustable lighting system 100 in order to allow a user to modify aspects of the operation of the adjustable lighting system 100, and to set a configuration for the adjustable lighting system 100. In some embodiments, the user interface device 110 allows the user to control operating parameters and characteristics of the lighting control components 104. In some embodiments, the user interface device 110 allows user control of settings that regulate operation of the controller 102, such as by modifying how the controller 102 responds to signals received from the light condition sensors 106.

As one example, the user interface device 110 may allow the user to select a setting for the intensity level, color temperature, or color of the illumination provided by the adjustable lighting system 100. The user may select from predetermined illumination intensity settings, such as a high illumination intensity level, a medium illumination intensity level, or a low illumination intensity level setting. As another example, the user interface device 110 may be configured to allow the user to create and store custom settings for the configuration of the adjustable lighting system 100. As another example, the user interface device 110 may be configured to allow the user to set the configuration for the internal light condition to be equivalent to the current state of the internal light condition, and this configuration may be saved as a predetermined state that can be used at a later time. Thus, if the user is pleased with the current lighting conditions, information describing the current lighting conditions, such as values reported by the internal sensors 118, may be stored in order to allow the same lighting conditions to be recreated at a different time.

In some embodiments, as will be explained herein, different light condition settings may be applied to different areas that are illuminated by the adjustable lighting system 100. The user interface device 110 may provide an interface screen that allows selection of light condition settings on an area-by-area basis, such as by incorporating a graphical, map-like depiction of the areas. Thus, for example, the lighting devices 114 may include a first electric lamp and a second electric lamp, wherein the controller 102 determines a first configuration for the first electric lamp based on a first user input made with the user interface device 110, and the controller 102 determines a second configuration for the second electric lamp based on a second user input made with the user interface device 110. The controller 102 then modifies operation of the first electric lamp based on the first configuration, and the controller 102 modifies operation of the second electric lamp based on the second configuration.

In some embodiments, as will be explained herein, the user interface device 110 may allow the user to define or select a gradient-type lighting configuration that varies spatially between a first light condition and a second light condition. Based on the user selection of the gradient-type lighting configuration, the controller 102 may cause a plurality of lamps from the lighting devices 114 to emit light according to the gradient.

The controller 102 may determine a configuration for the light condition based on a sample from a portion of the image of a still image or video image. For example, the sample includes a color value and an intensity, and the controller modifies operation of the lighting control components 104 based on the color value and/or intensity. In some embodiments, the portion of the image is identified based on a user input that selects the portion of the image. Thus, the user may select a configuration for the light condition by selecting a portion of a still image or video image using the user interface device 110, and the controller 102 will modify operation of the adjustable lighting system 100 according to the brightness and/or colors that are present in the portion of the still image or video image.

In some embodiments where a video is utilized for selecting a desired lighting condition using the user interface device 110, the controller 102 may utilize the brightness and/or colors that are present in the portion of the video at time the selection is made. In some embodiments where a video is utilized for selecting a desired lighting condition using the user interface device 110, the controller 102 may vary the desired lighting condition at time intervals according to changes in the brightness and/or colors that are present in the portion of the video as they change over time. Thus, the controller 102 may periodically receive an updated image subsequent to receiving a previous image, and the controller 102 may modify operation of the one or more lighting control components 104 based on the updated image.

In embodiments where a portion of a still image or video image is selected using the user interface device 110, the user interface device 110 may receive a first user selection that indicates a first portion of the still image or video and a second user selection that indicates a second portion of the still image or video. The controller 102 may utilize the first user selection and the second user selection to identify first and second desired light conditions, such as a first and second color, color temperature, and/or illumination intensity values. Thus, as an example, the lighting devices 114 may include a first electric lamp and a second electric lamp, wherein the controller 102 determines the configuration based on a first color value from a first portion of the image and a second color value from a second portion of the image, the controller 102 modifies operation of the first electric lamp based on the first color value, and the controller 102 modifies operation of the second electric lamp based on the second color value. As another example, the controller 102 may utilize the first user selection and the second user selection to identify a color gradient in the image and modify operation of the lighting devices 114 based on the color gradient.

The user interface device 110 may communicate with the adjustable lighting system 100 by a wired connection or a wireless connection that allows information to be exchanged between the controller 102 and the user interface device 110. In some embodiments, the user interface device 110 is a dedicated component of the adjustable lighting system 100. In some embodiments, the user interface device 110 is a non-dedicated component, such as a computing device that is associated with a user of the adjustable lighting system 100. As an example, a user's smartphone or tablet computer may serve as the user interface device by communicating with the controller 102 through a user interface application that executes on the user's device.

Figure 2:
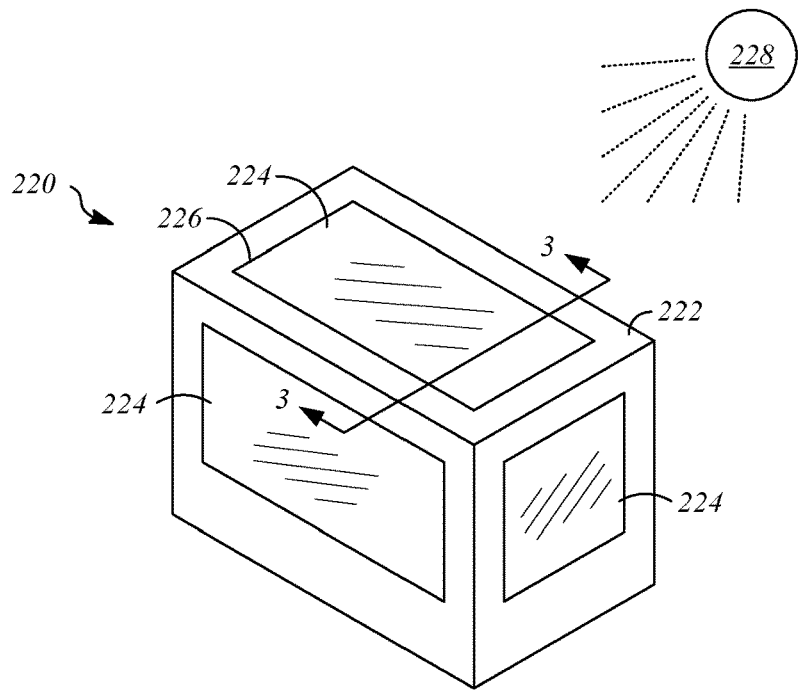
FIG. 2 is a perspective view illustration showing an enclosure.

FIG. 2 is a perspective view illustration showing an enclosure 220. The enclosure 220 includes one or more structural elements 222 and one or more windows 224. The structural elements 222 define the shape of the enclosure 220 and define openings 226 in the enclosure 220, with the windows 224 being positioned in the openings 226. The structural elements 222 may be formed from any material in any type of configuration. As examples, the structural elements 222 may be formed from wood, masonry, steel, and/or aluminum. The windows 224 permit passage of light into the enclosure 220. The windows 224 may be formed from a transparent or translucent material, such as glass or plastic. Light from an external light source 228 is incident upon the enclosure 220. The external light source 228 is positioned outside the enclosure 220. As one example, the external light source 228 may be a natural light source such as the sun. As another example, the external light source 228 may be an artificial light source such as electric lighting that is positioned outside of the enclosure 220.

Figure 3:
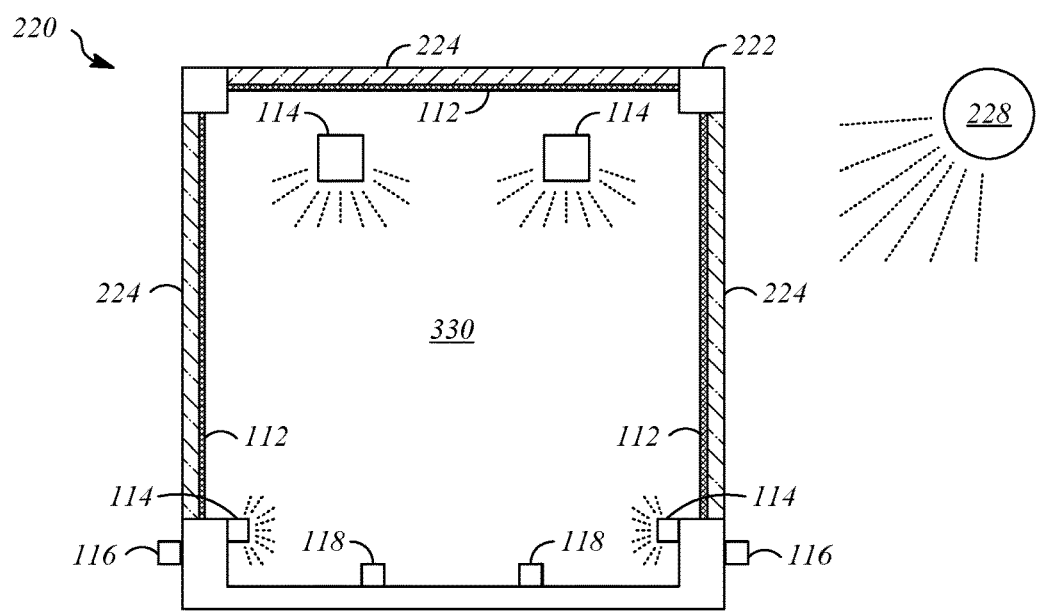
FIG. 3 is a cross-section view illustration taken along line 3-3 of FIG. 2 showing the enclosure and the adjustable lighting system.

FIG. 3 is a cross-section view illustration taken along line 3-3 of FIG. 2 showing the enclosure 220. The enclosure 220 has an interior space 330. The interior space 330 may be partially or fully separated from the exterior of the enclosure 220 by the structural elements 222, the windows 224, and optionally by other components that are associated with the enclosure 220.

Some or all of the components of the adjustable lighting system 100 of FIG. 1 are incorporated in and/or used with the enclosure 220 in order to adjust an internal light condition that is present in the interior space 330 of the enclosure 220. In the illustrated example, the VLT components 112 are disposed in or on the windows 224, the lighting devices 114 are disposed within the interior space 330 of the enclosure 220, the external illumination sensors 116 are located at the exterior of the enclosure 220 to sense the external light condition that the enclosure 220 is subject to, and the internal sensors 118 are located in the interior space of the enclosure 220 to sense the internal light condition.

In the embodiment of FIG. 3, the internal light condition is a function of the external light condition, the light transmittance characteristic of the VLT components 112, and the illumination intensity of the lighting devices 114. The internal light condition may further be a function of a color temperature characteristic and/or a color characteristic of the lighting devices 114. The controller 102 is operable to modify operation of the VLT components 112 and/or the lighting devices 114 to maintain a configuration for the internal light condition.

In some embodiments, the controller 102 receives the internal light condition signal from the internal sensors 118 and modifies operation of the VLT components 112 and/or the lighting devices 114 to cause the internal light condition signal to conform to desired values that correspond to the configuration for the internal light condition. The internal sensors 118 allow the controller 102 to exercise feedback-based control that accounts for the internal light condition as a function of the external light condition in combination with blocking of the external light by the VLT components 112 and addition of internal light by the lighting devices 114.

In some embodiments, the external light condition signal from the external illumination sensors 116 is utilized in conjunction with the internal light condition signal. For example, the sensor may modify operation of the VLT components 112 and/or the lighting devices 114 in response to a change in the external light condition signal that exceeds a predetermined magnitude. This change may correspond to an abrupt change in external light conditions, such as a cloud passing in front of the sun. By utilizing the external light condition signal in addition to the internal light condition signal, abrupt changes in lighting conditions can be detected and operating characteristics modified accordingly, without false signals that may occur inside the enclosure 220, for example, as a result of a person moving past one of the internal sensors 118. As another example, the controller 102 may be configured to, in accordance with the internal light condition signal from the internal sensors 118 being below a threshold illumination, increase light transmittance of the VLT components 112. As another example, the controller 102 may be configured to, in accordance with the internal light condition signal from the internal sensors 118 being above a threshold illumination, decrease transmittance of the VLT components 112.

In some embodiments, the extent to which external light is blocked by the VLT components 112 is selected in order to attain a desired color and/or color temperature for the internal light condition. For instance, when the external light is bright, the VLT components 112 may be controlled by the controller 102 to reduce the light transmittance characteristic of the VLT components. This reduces the intensity of the external light that enters the enclosure 220, and allows a higher intensity of light to be emitted by the lighting devices 114 in response to an appropriate command from the controller 102. Because the lighting devices 114 are able to emit light at a greater intensity, they are able to have greater influence on aspects of the internal light condition, such as the color and color temperature of the lighting inside the enclosure 220.

Figure 4:
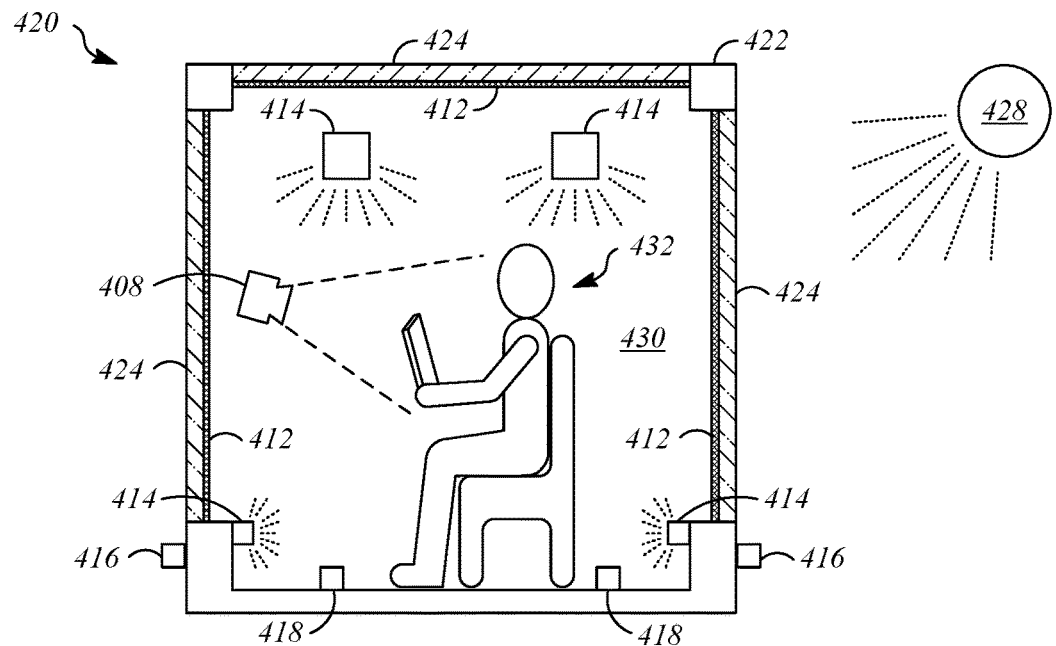
FIG. 4 is a cross-section view illustration taken along line 3-3 of FIG. 2 showing the enclosure and a second example of an adjustable lighting system.

FIG. 4 is a cross-section view illustration taken along line 3-3 of FIG. 2 showing an enclosure 420 and a second example of an adjustable lighting system, which is similar to the adjustable lighting system 100 and is consistent with the description made in connection with respect to FIGS. 1-3 except as described herein.

The enclosure 420 has an interior space 430 defined by structural elements 422, windows 424, and optionally by other components. The enclosure includes a controller 402, one or more cameras 408, VLT components 412, lighting devices 414, external illumination sensors 416 to sense the external light condition, and internal sensors 418 to sense the internal light condition. Light from an external light source 428 is incident upon the enclosure 420.

An occupant 432 is located in the interior space 430 of the enclosure 420, and is engaged in an activity. Examples of activities include eating, sleeping, reading, watching television, and using computing devices and other electronic devices. The occupant 432 is located within a field-of-view of the camera 408. The camera 408 captures an image or a series of images (e.g., a movie) depicting objects and persons that are located in the interior space 430 of the enclosure 420. The controller analyzes the image or images that are generated by the camera 408 to identify an activity that is depicted in the image or images. As an example, the controller 402 may utilize an image content analysis algorithm to identify the activity depicted in the image or images.

The controller 402 may modify the light condition within the enclosure 420 based on the activity depicted in the image or images. As an example, activities may be associated with predetermined settings for the configuration of the internal light condition of the enclosure 420. On determining that an activity is occurring in the enclosure 420, the controller 402 may access information that identifies a light condition that is associated with the activity and modify operation of components such as the VLT components 412 and the lighting devices 414 to achieve and maintain the desired light condition. Thus, as one example, when the user is using a light-emissive device, such as a tablet computer, the light condition can be adjusted to allow comfortable use of the device. As another example, if the user is using a camera to take a photograph of himself or herself (i.e., a "selfie"), the light condition can be adjusted to evenly light the user's face.

In some embodiments, the controller 402 may control the light condition separately for multiple areas of the interior space 430 of the enclosure 420. As an example, the cameras 408 may include first and second cameras that output images depicting first and second areas of the interior space 430. Upon determining, based on an analysis of the images generated by the first and second cameras, that different activities are occurring in the first and second areas, the controller 402 may identify different light conditions for the first and second areas, and modify operation of components such as the VLT components 412 and the lighting devices 414 in order to achieve and maintain a first light condition in the first area and a second light condition in the second area.

Figure 5:
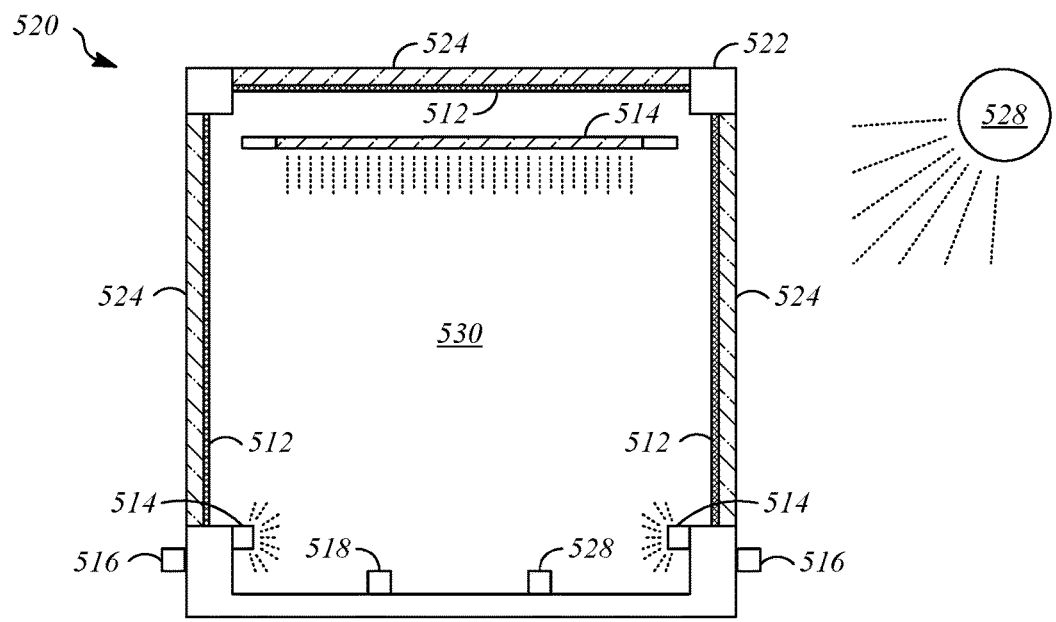
FIG. 5 is a cross-section view illustration taken along line 3-3 of FIG. 2 showing the enclosure and a third example of an adjustable lighting system.

FIG. 5 is a cross-section view illustration taken along line 3-3 of FIG. 2 showing an enclosure 520 and a third example of an adjustable lighting system, which is similar to the adjustable lighting system 100 and is consistent with the description made in connection with respect to FIGS. 1-3 except as described herein.

The enclosure 520 has an interior space 530 defined by structural elements 522, windows 524, and optionally by other components. The enclosure includes a controller 502, VLT components 512, one or more lighting devices that include an edge lit panel 514 that provides internal light for the interior space 530, external illumination sensors 516 to sense the external light condition, and internal sensors 518 to sense the internal light condition. Light from an external light source 428 is incident upon the enclosure 520. The edge lit panel 514 is positioned adjacent to one of the windows 524. In some embodiments, the edge lit panel 514 is spaced from the respective one of the windows 524. In some embodiments, the edge lit panel 514 is mounted such that it is in contact with the respective one of the windows 524. In some embodiments, the edge lit panel 514 is a laminated layer of the respective one of the windows 524.

External light from the external light source 528 passes through one of the windows 524, and at least a portion of the external light also passes through the edge lit panel 514. The external light that passes through the edge lit panel 510 combines with the internal light that is emitted by the edge lit panel 514, and the combined light from external light source 528 and the edge lit panel 514 affects the internal light condition in the interior space 530 of the enclosure 520.

Figure 6:
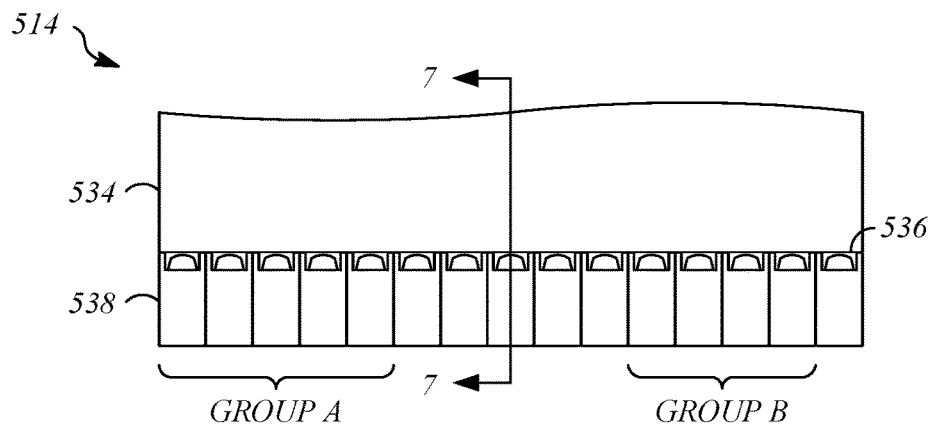
FIG. 6 is an illustration showing a portion of an edge lit panel.

FIG. 6 is an illustration showing a portion of the edge lit panel 514. The edge lit panel includes a panel portion 534 that includes one or more layers of transparent or translucent material, such as glass. The panel portion 534 may be flat or non-flat, such as by including a side-to-side curvature.

An array of lighting elements 536 is positioned along an edge 538 of the panel portion 534. The array of lighting elements 536 may be an array of electric lamps. The array of lighting elements 536 is positioned such that the light emitted by the array of lighting elements 536 shines through the edge 538 of the panel portion 534 and into the interior of the panel portion 534. The lighting elements from the array of lighting elements 536 may be electric lamps, such as light-emitting diodes. Although the edge 538 is depicted as a single edge of the panel portion 534, the panel portion 534 may include multiple edges that may include additional arrays of lighting elements that are similar to the array of lighting elements 536.

Figure 7:
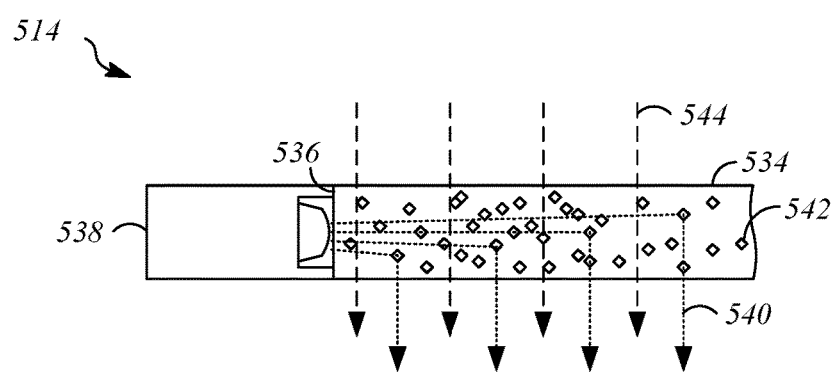
FIG. 7 is a cross-section view illustration taken along line 7-7 of FIG. 6 showing a portion of the edge lit panel.

FIG. 7 is a cross-section view illustration taken along line 7-7 of FIG. 6 showing a portion of the edge lit panel 514. Internal light 540 that is emitted by the array of lighting elements 536 may be oriented such that some or all of the internal light 540 is initially retained within the panel portion 534 by total internal reflection. A portion of the internal light 540 is incident upon particles 542 that are suspended in the panel portion 534, and the internal light 540 may be redirected by reflection or refraction at an angle that allows the internal light 540 to exit the panel portion 534 and enter the interior space 530. External light 544 from the windows 524 is incident upon the panel portion 534, and passes through the panel portion 534 such that the light exiting the panel portion 534 into the interior space 530 of the enclosure 520 is a combination of the internal light 540 and the external light 544.

The controller 502 may control operation of the edge lit panel 514 based on the internal light condition in the interior space 530. For example, the controller 502 may receive an internal light condition signal from the internal sensors 518 and modify operation of the one or more lighting control components to achieve a configuration for the internal light condition. As one example, the controller 502 may be configured to, in accordance with the internal light condition signal from the internal sensors 518 being below a threshold illumination, decrease light transmittance of the VLT components 512 and increase illumination intensity from the edge lit panel 514. As another example, the controller 502 may be configured to, in accordance with an external light condition signal from the external illumination sensors 516 being above a threshold illumination, increase light transmittance of the VLT components 512 and decrease illumination intensity of the edge lit panel 514. As another example, the controller 502 may be configured to, in accordance with an external light condition signal from the external illumination sensors 516 being below a threshold illumination, decrease light transmittance of the VLT components 512 and increase illumination intensity of edge lit panel 514. As another example, the controller 502 may be configured to, in accordance with an external light condition signal below a threshold illumination, increase light transmittance of the VLT components 512 and increase illumination intensity of edge lit panel 514.

In some embodiments, portions of the array of lighting elements 536 or individual lighting elements from the array of lighting elements 536 may be separately addressed and controlled by the controller 502. As one example, the controller 502 may set illumination characteristics for a first group (e.g., GROUP A in FIG. 6) of one or more lighting elements from the array of lighting elements 536 and may set different illumination characteristics for a second group (e.g., GROUP B in FIG. 6) of one or more lighting elements from the array of lighting elements 536. In this manner, the controller 502 may use the edge lit panel 514 to set a first light condition in a first area of the interior space 530 and a second light condition in a second area of the interior space 530. As another example, based on a first light condition and a second light condition that differ in any or all of illumination intensity, color temperature, and color value, the controller 502 may modify operation of multiple groups of one or more lighting elements from the array of lighting elements 536 to create a gradient effect that varies along a length and/or width of the edge lit panel 514 between the first light condition and the second light condition.

Figure 8:
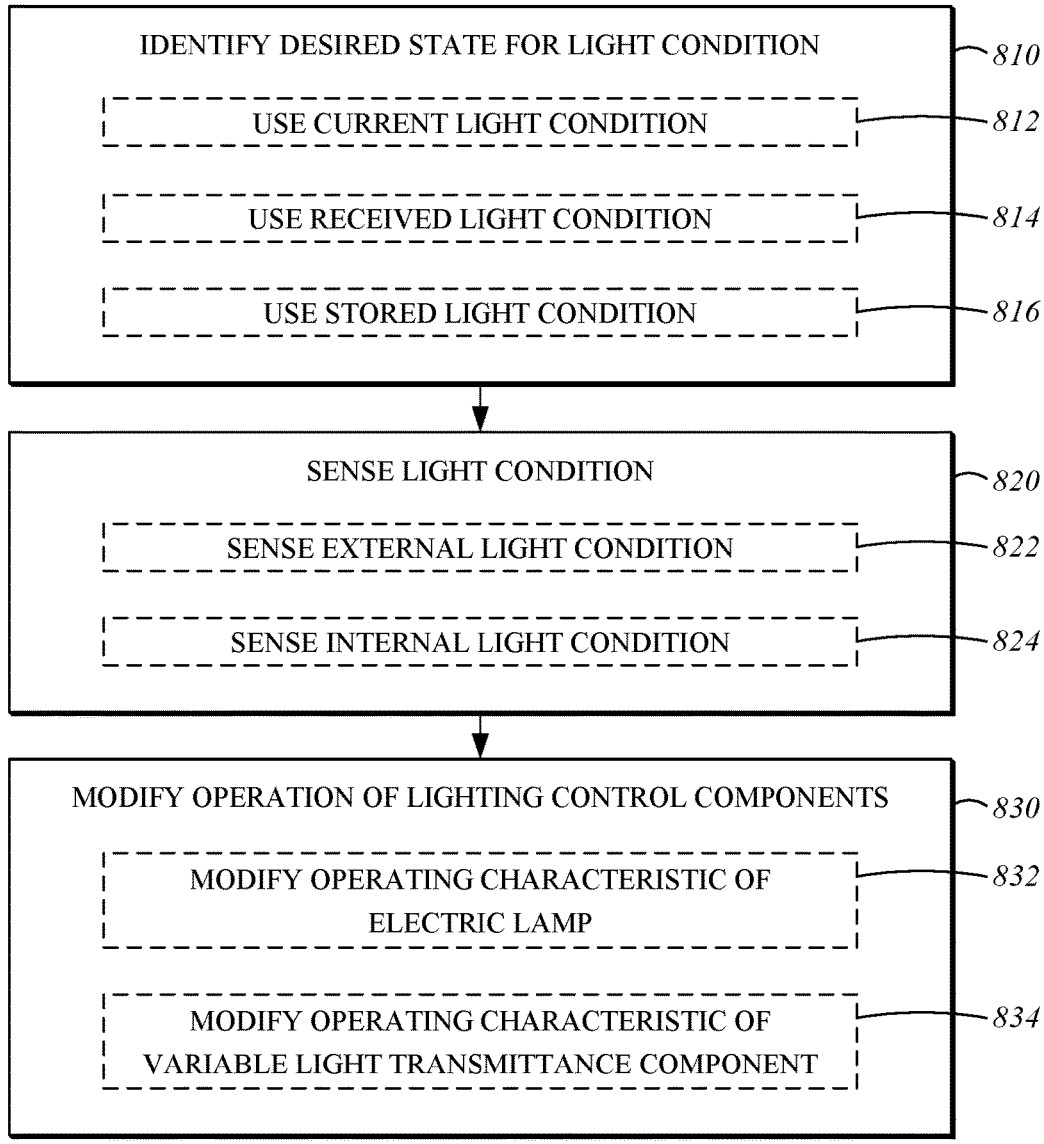
FIG. 8 is a flowchart showing a first lighting control process.

FIG. 8 is a flowchart showing a first lighting control process 800. The first lighting control process 800 may be implemented using, as examples, the adjustable lighting systems described in connection with FIGS. 1-7. The first lighting control process 800 may be implemented by executing computer program instructions using, for example, controller 102 of the adjustable lighting system 100.

In operation 810, a configuration is identified for the internal light condition. The configuration may be identified, as examples, based on a default state or as described with respect to the user interface device 110. Operation 810 may include sub-operation 812, in which the configuration for the internal light condition is identified by using a current internal light condition as the configuration for the internal light condition. Operation 810 may include sub-operation 814, in which the configuration for the internal light condition is identified using a received lighting condition, which may be a light condition described by inputs received from a user. Operation 810 may include sub-operation 816, in which the configuration for the internal light condition is identified using a previously-stored lighting condition, which may be selected by a user from a group of one or more previously-stored lighting conditions.

In operation 820, a light condition is sensed. Operation 820 may be performed, for example, using the light condition sensors 106 of the adjustable lighting system 100. Operation 820 may include one or both of sub-operations 822 and 824. Sub-operation 822 includes sensing an external light condition. For example, one or more of the external illumination sensors 116 of the adjustable lighting system 100 may be used to sense the external light condition and generate the external light condition signal that corresponds to the external light condition. Sub-operation 824 includes sensing an internal light condition. For example, one or more of the internal sensors 118 of the adjustable lighting system 100 may be used to sense the internal light condition and generate the internal light condition signal that corresponds to the internal light condition.

Operation 830 includes modifying operation of lighting control components, such as by modifying one or more illumination characteristics of the lighting control components 104 of the adjustable lighting system 100. Operation of the lighting control components may be modified based on the configuration for the light condition and the sensed values of the external and/or internal light conditions. Operation 830 may include one or both of sub-operations 832 and 834. Sub-operation 832 includes modifying an operating characteristic of one of the lighting devices 114 of the adjustable lighting system 100, such as one or more electric lamps. Sub-operation 834 includes modifying an operating characteristic of one or more of the VLT components 112 of the adjustable lighting system 100.

Figure 9:
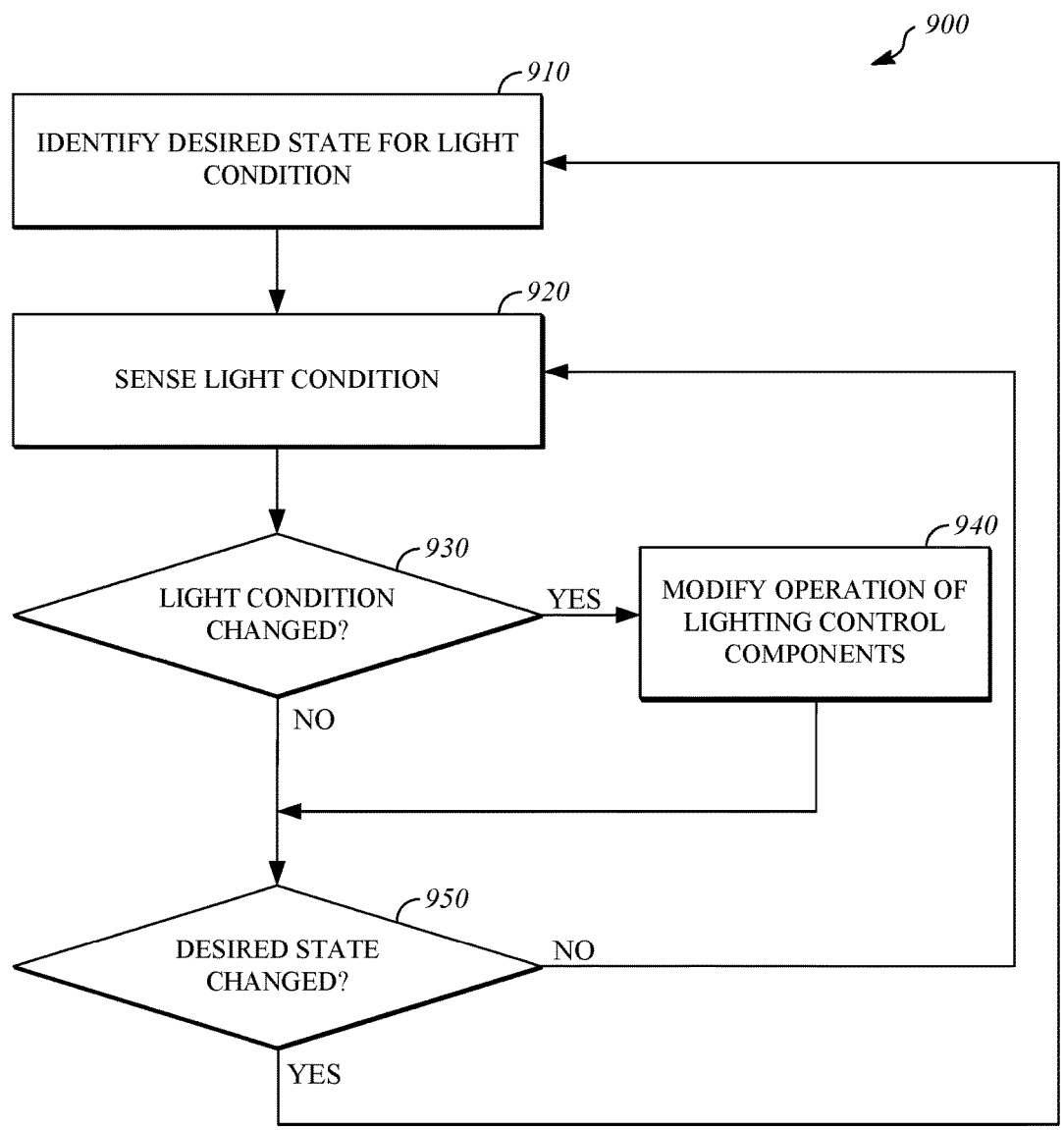
FIG. 9 is a flowchart showing a second lighting control process.

FIG. 9 is a flowchart showing a second lighting control process 900. The second lighting control process 900 may be implemented using, as examples, the adjustable lighting systems described in connection with FIGS. 1-7. The second lighting control process 900 may be implemented by executing computer program instructions using, for example, controller 102 of the adjustable lighting system 100.

In operation 910, a configuration is identified for the internal light condition. In operation 920, a current light condition is sensed, such as the external light condition or the internal light condition. In operation 930 a determination is made, for example, by the controller 102 of the adjustable lighting system 100, as to whether the light condition that was sensed in operation 920 has changed relative to a previously-sensed light condition. If the light condition has changed, the process proceeds to operation 940, where the light condition is modified to the previous state of the light condition, to restore the light condition to the state it was in prior to the change detected in operation 930. Modifying the light condition in operation 940 can be performed, for example, by the controller 102 sending commands to the lighting control components 104 to modify one or more operating parameters of the lighting control components 104. If, per the determination made in operation 930, the light condition has not changed, then operation 940 is skipped.

In operation 950, if the configuration of the light condition has changed, the process returns to operation 910, where the configuration of the light condition is identified again. Otherwise, the process returns to operation 920.

Figure 10:
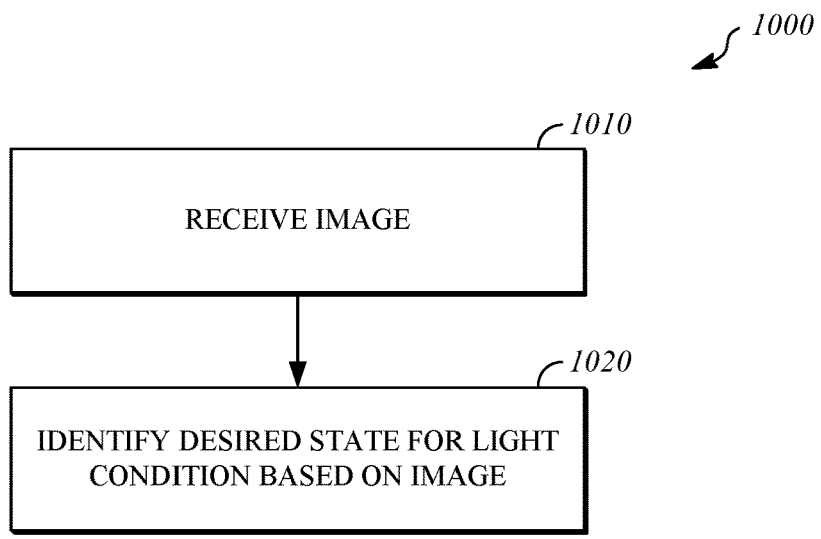
FIG. 10 is a flowchart showing a third lighting control process.

FIG. 10 is a flowchart showing a third lighting control process 1000, which is an example of identifying the configuration for the light condition and can be utilized in conjunction with other processes, such as the first lighting control process 800 and the second lighting control process 900. The third lighting control process 1000 may be implemented using, as examples, the adjustable lighting systems described in connection with FIGS. 1-7. The third lighting control process 1000 may be implemented by executing computer program instructions using, for example, controller 102 of the adjustable lighting system 100.

In operation 1010, an image (i.e., data that represents an image) is received. As examples, an image can be received by accessing a stored image, by capturing an image using a camera, or by receiving an image by a data transmission from a remote computing device. In operation 1020, the configuration for the light condition is identified based on the image that was received in operation 1010. As examples, the configuration may be identified by sampling all or part of the image and identifying a light intensity based on the brightness of the sample and/or identifying a color based on the color present in the sampled portion of the image. The identified brightness or color may be, for example, an average brightness or an average color in the selected portion of the image. The configuration identified in operation 1020 may then be used to control lighting characteristics as described in other embodiments and processes.

Figure 11:
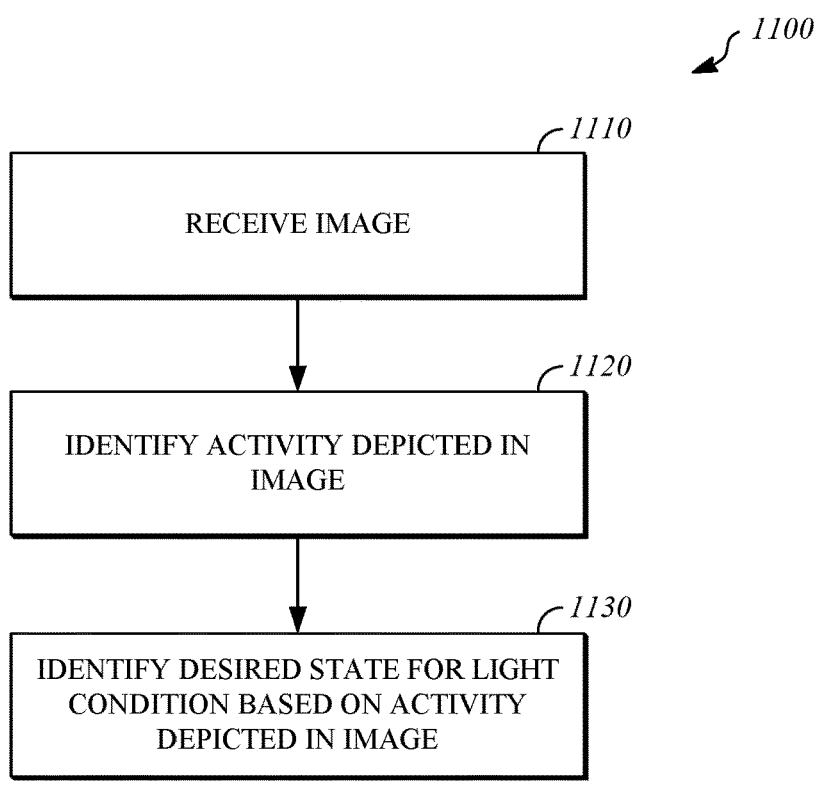
FIG. 11 is a flowchart showing a fourth lighting control process.

FIG. 11 is a flowchart showing a fourth lighting control process 1100, which is an example of identifying the configuration for the light condition and can be utilized in conjunction with other processes, such as the first lighting control process 800 and the second lighting control process 900. The fourth lighting control process 1100 may be implemented using, as examples, the adjustable lighting systems described in connection with FIGS. 1-7. The fourth lighting control process 1100 may be implemented by executing computer program instructions using, for example, controller 102 of the adjustable lighting system 100.

In operation 1110, an image is received. As examples, an image can be received by accessing a stored image, by capturing an image using a camera, or by receiving an image by a data transmission from a remote computing device. In operation 1120, the image is analyzed to identify an activity that is depicted in the image. Operation 1120 may be performed, for example, by using an image content analysis algorithm that is executed by the controller 102 of the adjustable lighting system 100, or by another computing device.

In operation 1130, the configuration for the light condition is identified based on the activity depicted in the image that was received in operation 1010. As an example, stored light condition values may be stored for specific activities, such as in a table or in a database that relates the activities to the stored light condition values. The configuration identified in operation 1130 may then be used to control lighting characteristics as described in other embodiments and processes.

Figure 12:
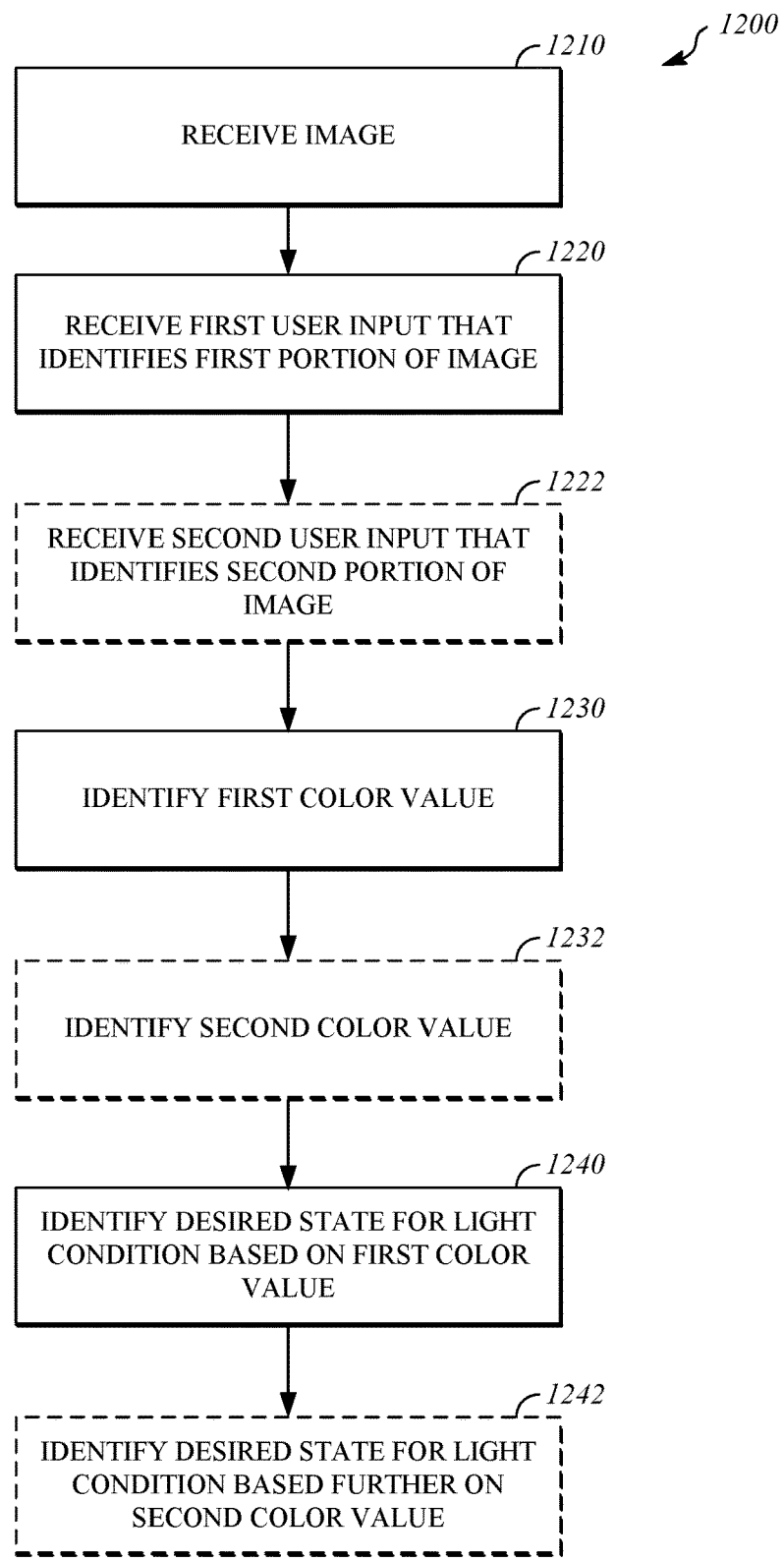
FIG. 12 is a flowchart showing a fifth lighting control process.

FIG. 12 is a flowchart showing a fifth lighting control process 1200, which is an example of identifying the configuration for the light condition and can be utilized in conjunction with other processes, such as the first lighting control process 800 and the second lighting control process 900. The fifth lighting control process 1200 may be implemented using, as examples, the adjustable lighting systems described in connection with FIGS. 1-7. The fifth lighting control process 1200 may be implemented by executing computer program instructions using, for example, controller 102 of the adjustable lighting system 100.

In operation 1210, an image is received. As examples, an image can be received by accessing a stored image, by capturing an image using a camera, or by receiving an image by a data transmission from a remote computing device. In operation 1220, a first user input is received. The first user input identifies a first portion of the image. Operation 1220 may be performed using the user interface device 110 of the adjustable lighting system 100. As an example, using a computing device that incorporates a touchscreen interface device, the user may tap an area of the screen where the image is displayed in order to select the portion of the image that is being displayed at the location of the tap. In optional operation 1222, a second user input may be received in the same manner described with respect to operation 1220. The second user input identifies a second portion of the image that was received in operation 1210.

In operation 1230, a first color value is identified based on the first portion of the image, such as by sampling the first color value from the first portion of the image. In optional operation 1232, a second color value is identified based on the second portion of the image, such as by sampling the second color value from the second portion of the image.

In operation 1240, the configuration for the light condition is identified based on the first color value that was identified in operation 1230, such as by setting a configuration for the internal light condition such that the same color is achieved in the illuminated space. In optional operation 1242, the configuration for the light condition is identified based further on the second color value that was identified in optional operation 1232. As one example, a first group of lighting devices from the lighting devices 114 of the adjustable lighting system 100 may be operated to achieve the first color value that was identified in operation 1230, and a second group of lighting devices from the lighting devices 114 of the adjustable lighting system 100 may be operated to achieve the second color value that was identified in optional operation 1232. As another example, the first color value and the second color value may be used to define a gradient, such as by averaging values spatially between the first color value and the second color value, and this gradient may be recreated within the illuminated space, such as by using the edge lit panel 514 of the enclosure 520 as described in connection with FIGS. 5-7. The configuration identified in operation 1240 and optionally further identified in optional operation 1242 may then be used to control lighting characteristics as described in other embodiments and processes.

Figure 13:
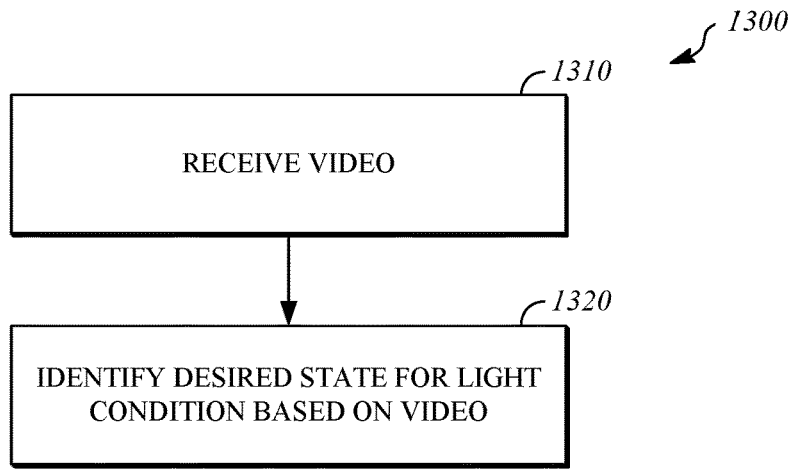
FIG. 13 is a flowchart showing a sixth lighting control process.

FIG. 13 is a flowchart showing a sixth lighting control process 1300, which is an example of identifying the configuration for the light condition and can be utilized in conjunction with other processes, such as the first lighting control process 800 and the second lighting control process 900. The sixth lighting control process 1300 may be implemented using, as examples, the adjustable lighting systems described in connection with FIGS. 1-7. The sixth lighting control process 1300 may be implemented by executing computer program instructions using, for example, controller 102 of the adjustable lighting system 100.

In operation 1310, a video (i.e., data that represents one or more video frames) is received. As examples, the video can be received by accessing a stored video, by capturing a video using a camera, or by receiving a video by a data transmission from a remote computing device. In operation 1320, the configuration for the light condition is identified based on the video that was received in operation 1010. As examples, the configuration may be identified by sampling all or part of one or more frames from the video and identifying a light intensity based on the brightness of the sample and/or identifying a color based on the color present in the sampled portion of the video. The identified brightness or color may be, for example, an average brightness or an average color in the selected portion of the video. The configuration identified in operation 1320 may then be used to control lighting characteristics as described in other embodiments and processes.

Figure 14:
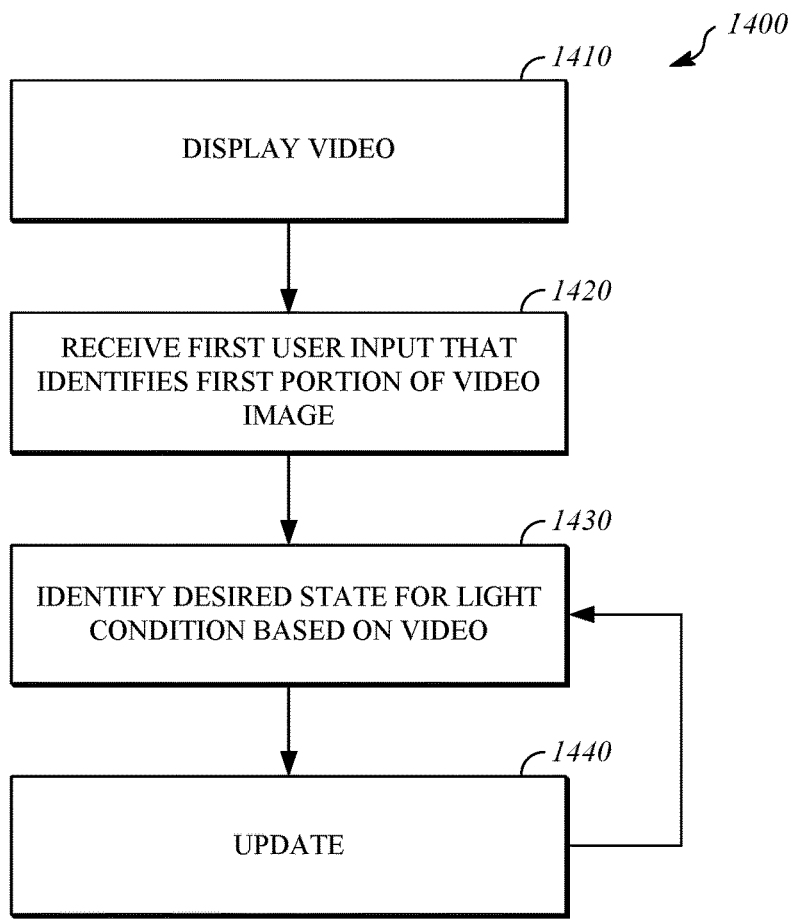
FIG. 14 is a flowchart showing a seventh lighting control process.

FIG. 14 is a flowchart showing a seventh lighting control process 1400, which is an example of identifying the configuration for the light condition and can be utilized in conjunction with other processes, such as the first lighting control process 800 and the second lighting control process 900. The seventh lighting control process 1400 may be implemented using, as examples, the adjustable lighting systems described in connection with FIGS. 1-7. The seventh lighting control process 1400 may be implemented by executing computer program instructions using, for example, controller 102 of the adjustable lighting system 100.

In operation 1410, a video is displayed in the space that is illuminated, for example, using the user interface device 110, or another device that is located in the space and is in communication with the controller 102. The video being displayed may be received by the playback device, for example, by accessing a stored video, by capturing a video using a camera, or by receiving a video by a data transmission from a remote computing device.

In operation 1420, a first user input is received. The first user input identifies a first portion of the video. Operation 1420 may be performed using the user interface device 110 of the adjustable lighting system 100. As an example, using a computing device that incorporates a touchscreen interface device, the user may tap an area of the screen where the video is displayed in order to select the portion of the video that is being displayed at the location of the tap.

In operation 1430, the configuration for the light condition is identified based on the video that was displayed in operation 1410, by sampling one or more frames of the video. In particular, the configuration may be identified by sampling one or more frames of the video at the location identified by the first user input received in operation 1420, and identifying a light intensity based on the brightness of the sample and/or identifying a color based on the color present in the sampled portion of the video. The identified brightness or color may be, for example, an average brightness or an average color in the selected portion of the video. The configuration identified in operation 1430 may then be used to control lighting characteristics as described in other embodiments and processes.

As display of the video continues, the process proceeds to operation 1440, in which an update of the configuration for the light condition is initiated. The update may be performed once per frame of the video, at predetermined intervals, at random intervals, or according to any other schedule or in response to any condition. After the update is initiated in operation 1440, the process returns to operation 1430 to again identify the configuration for the light condition.

Figure 15:
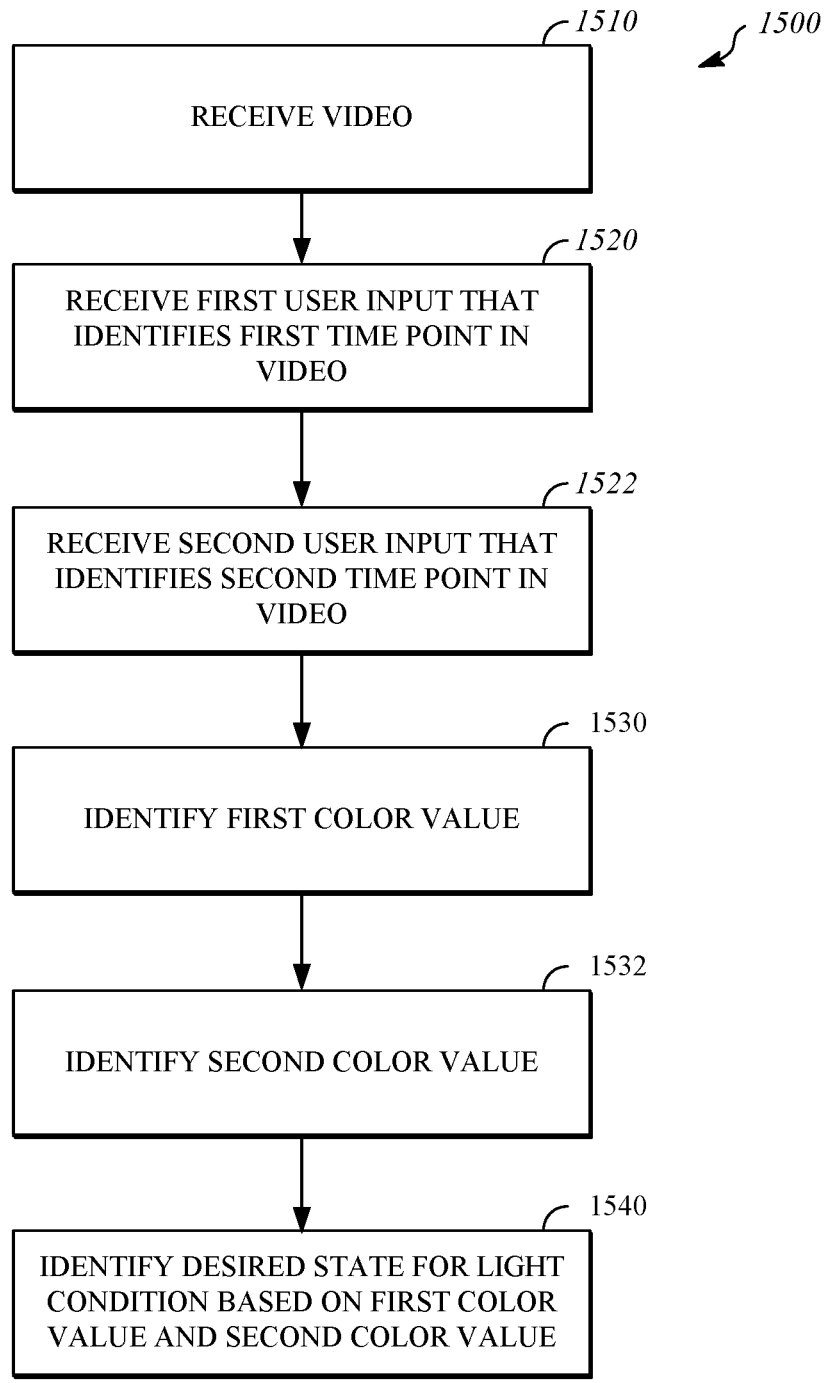
FIG. 15 is a flowchart showing an eighth lighting control process.

FIG. 15 is a flowchart showing an eighth lighting control process 1500, which is an example of identifying the configuration for the light condition and can be utilized in conjunction with other processes, such as the first lighting control process 800 and the second lighting control process 900. The eighth lighting control process 1500 may be implemented using, as examples, the adjustable lighting systems described in connection with FIGS. 1-7. The eighth lighting control process 1500 may be implemented by executing computer program instructions using, for example, controller 102 of the adjustable lighting system 100.

In operation 1510, a video is received. As examples, an image can be received by accessing a stored image, by capturing an image using a camera, or by receiving an image by a data transmission from a remote computing device. In operation 1520, a first user input is received. The first user input identifies a first time point in the video. Operation 1520 may be performed using the user interface device 110 of the adjustable lighting system 100. In operation 1522, a second user input is received. The second user input identifies a second time point in the video. Operation 1520 may be performed using the user interface device 110 of the adjustable lighting system 100.

In operation 1530, a first color value is identified based on the first time point of the video, such as by sampling the first color value from a portion of a video frame from the first time point of the video. In operation 1532, a second color value is identified based on the second time point of the video, such as by sampling the second color value from a portion of a video frame from the second time point of the video.

In operation 1540, the configuration for the light condition is identified based on the first color value that was identified in operation 1530 and the second color value that was identified in operation 1532. As an example, the configuration for the internal light condition may be set such that it initially is based on the first color, and changes to the second color during a time period. Thus, the configuration for the internal light condition may change over time, such as by a gradual transition from the first color to the second color. The time period may correspond to a temporal separation of the first and second time points of the video. Additional time points may also be used to identify other colors from the video for setting the configuration of the light condition.

The configuration identified in operation 1540 may then be used to control lighting characteristics as described in other embodiments and processes. This control may occur independent of display of the video. As an example, the configuration determined in operation 1540 may be saved for later use.

Figure 16:
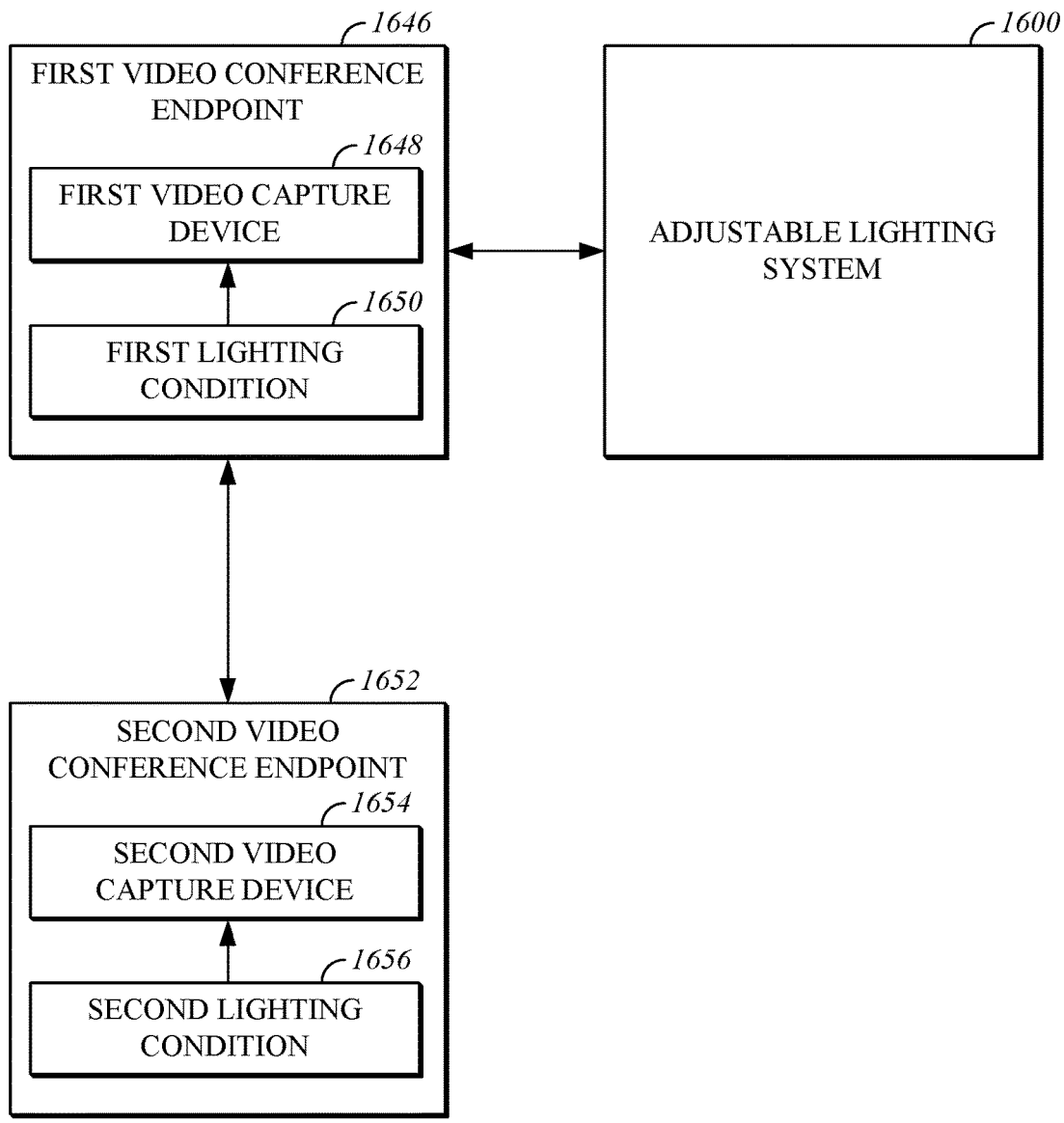
FIG. 16 is a block diagram showing communications between a first video conference endpoint, a second video conference endpoint, and an adjustable lighting system.

FIG. 16 is a block diagram showing communications between an adjustable lighting system 1600, a first video conference endpoint 1646, and a second video conference endpoint 1652. The adjustable lighting system 1600 may incorporate the same features as any or all of the adjustable lighting systems described with respect to FIGS. 1-7. The first video conference endpoint 1646 is located within an enclosure (not shown in FIG. 16) of the adjustable lighting system 1600, which may be similar to the enclosure 220 of FIG. 2.

The first video conference endpoint 1646 includes a first video capture device 1648 that is exposed to a first lighting condition 1650. The second video conference endpoint 1652 includes a second video capture device 1654 that is exposed to a second lighting condition 1656.

Video signals are transmitted between the first video conference endpoint 1646 and the second video conference endpoint 1652. The video captured at the second video conference endpoint 1652 is transmitted to the first video conference endpoint 1646, and is output for display at the first video conference endpoint 1646. The video received at the first video conference endpoint 1646 may be used to control the adjustable lighting system 1600. As examples, the video received at the first video conference endpoint 1646 from the second video conference endpoint 1652 may be used as described in the sixth lighting control process 1300 or the seventh lighting control process 1400. In some embodiments, the user of the first video conference endpoint 1646 may cause the adjustable lighting system 1610 to set the light condition based on a light condition in a selected portion of a video frame received from the second video conference endpoint 1652. In some embodiments, the user of the first video conference endpoint 1646 may cause the adjustable lighting system 1610 to periodically update the light condition in the illuminated space based on a light condition in a selected portion of a video frame recently received from the second video conference endpoint 1652.

Figure 17:
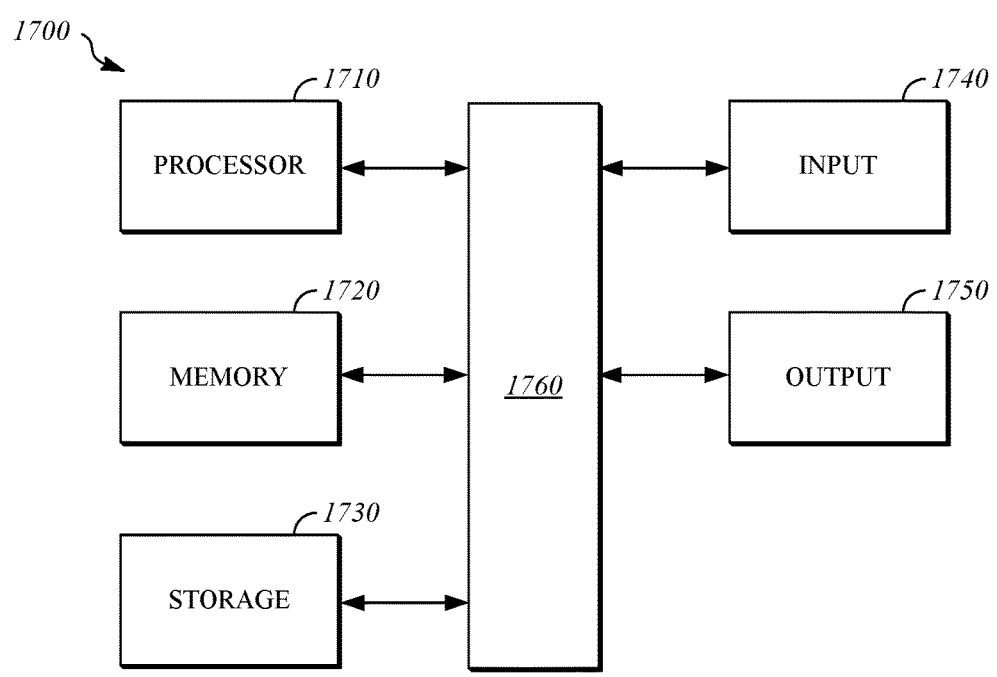
FIG. 17 is an illustration showing an example of a hardware configuration for a controller.

FIG. 17 shows an example of a hardware configuration for a controller 1700 that may be used to implement the controller 102 and/or other portions of the adjustable lighting system 100. In the illustrated example, the controller 1700 includes a processor 1710, a memory 1720, a storage device 1730, one or more input devices 1740, and one or more output devices 1750. These components may be interconnected by hardware such as a bus 1760 that allows communication between the components. The processor 1710 may be a conventional device such as a central processing unit, and is operable to execute computer program instructions and perform operations described by the computer program instructions. The memory 1720 may be a volatile, high-speed, short-term information storage device such as a random-access memory module. The storage device 1730 may be a non-volatile information storage device such as a hard drive or a solid state drive. The input devices 1740 may include any type of human-machine interface, such as buttons, switches, a keyboard, a mouse, a touchscreen input device, a gestural input device, or an audio input device. The output devices 1750 may include any type of device operable to provide an indication to a user regarding an operating state, such as a display screen or an audio output.

What is claimed is:

1. An apparatus, comprising:
    an enclosure that has one or more windows;
    one or more internal sensors that sense an internal light condition and generate an internal light condition signal that corresponds to the internal light condition;
    one or more lighting control components that include an edge lit panel that has a panel portion and an array of lighting elements that are positioned along an edge of the panel portion; and
    a controller configured to:
        receive data that represent an image that was captured by a camera;

determine a configuration for the internal light condition based on a color gradient defined by a first color value from a first portion of the image and a second color value from a second portion of the image, and control operation of the edge lit panel of the one or more lighting control components to define the color gradient in the enclosure according to the configuration for the internal light condition and the internal light condition signal.

2. The apparatus of claim 1, further comprising:
a first apparatus located in the enclosure, the first apparatus having a network interface that is configured to receive data representing the image is received from a second apparatus that is remote from the enclosure.

3. The apparatus of claim 1,
wherein the one or more lighting control components comprises a variable light transmittance component associated with the one or more windows, and
wherein the controller is configured to control a light transmittance characteristic of the variable light transmittance component.

4. The apparatus of claim 1,
wherein the one or more lighting control components comprises one or more dimmable lamps, and
wherein the controller is configured to control illumination intensity of the one or more dimmable lamps.

5. The apparatus of claim 1,
wherein the one or more lighting control components comprises one or more lamps having a variable output color temperature, and
wherein the controller is configured to control the variable output color temperature of the one or more lamps.

6. The apparatus of claim 1, further comprising:
a user interface device,
wherein the controller is further configured to:
cause display of the image to a user at the user interface device,
receive data identifying a the first portion of the image and the second portion of the image in response to a user input made at the user interface device.

7. The apparatus of claim 1, further comprising:
a user interface device,
wherein the controller is further configured to:
cause display of the image to a user at the user interface device,
receive data representing the first portion of the image in response to a first user input made at the user interface device, and
receive data representing the second portion of the image in response to a second user input made at the user interface device.

8. The apparatus of claim 1, wherein the controller is further configured to:
identify an activity that is depicted in the image, and
determine the configuration based on the activity that is depicted in the image.

9. The apparatus of claim 1, wherein the image is accessed from a storage device.

10. The apparatus of claim 1, wherein the image is received by a data transmission from a remote computing device.

11. The apparatus of claim 1, wherein the edge lit panel is positioned adjacent to a first window from the one or more windows.

12. The apparatus of claim 11, wherein the edge lit panel is spaced from the first window.

13. The apparatus of claim 11, wherein the edge lit panel is mounted such that it is in contact with the first window.

14. The apparatus of claim 11, wherein external light that enters the enclosure through the first window passes through the edge lit panel and combines with internal light emitted by the edge lit panel.

15. An apparatus, comprising:
an enclosure that has one or more windows that include a first window;
one or more internal sensors that sense an internal light condition and generate an internal light condition signal that corresponds to the internal light condition;
lighting control components that include a variable light transmittance component that is associated with the first window and an edge lit panel that has a panel portion and an array of lighting elements that are positioned along an edge of the panel portion, wherein the edge lit panel is positioned adjacent to the first window; and
a controller configured to:
receive data that represent an image that was captured by a camera;
determine a configuration for the internal light condition based on the image; and
control operation of the variable light transmittance component and the edge lit panel of the one or more lighting control components based on the internal light condition signal to maintain the internal light condition according to the configuration for the internal light condition.

16. An apparatus, comprising:
an enclosure that has an interior space and one or more windows that include a first window;
one or more internal sensors that sense an internal light condition and generate an internal light condition signal that corresponds to the internal light condition;
lighting control components that an edge lit panel that has a panel portion and an array of lighting elements that are positioned along an edge of the panel portion, wherein the edge lit panel is positioned adjacent to the first window; and
a controller configured to:
receive data that represent an image that was captured by a camera;
determine a configuration for the internal light condition that includes a first light condition that is based on a first color value from a first portion of the image and a second light condition that is based on a second color value from a second portion of the image, and
control operation of a first group of the lighting elements of the edge lit panel of to maintain the first light condition in a first area of the interior space, and
control operation of a second group of the lighting elements of the edge lit panel to maintain the second light condition in a second area of the interior space.

* * * * *

UNITED STATES PATENT AND TRADEMARK OFFICE
CERTIFICATE OF CORRECTION

Page 1 of 1

PATENT NO. : 10,477,659 B1
APPLICATION NO. : 15/682929
DATED : November 12, 2019
INVENTOR(S) : Clarisse Mazuir et al.

It is certified that error appears in the above-identified patent and that said Letters Patent is hereby corrected as shown below:

In the Claims

In Column 17, Claim Number 2, Line 13:
"the image is received" should be --the image that is received--.

In Column 18, Claim Number 16, Line 42:
"components that an edge lit panel" should be --components that include an edge lit panel--.

In Column 18, Claim Number 16, Line 56:
"edge lit panel of to maintain" should be --edge lit panel to maintain--.

Signed and Sealed this
Twenty-fourth Day of December, 2019

Andrei Iancu
*Director of the United States Patent and Trademark Office*